(12) United States Patent
Fewkes et al.

(10) Patent No.: US 8,696,215 B1
(45) Date of Patent: Apr. 15, 2014

(54) ADHESIVE COMPOSITIONS INCLUDING PARTIALLY CROSS-LINKED RESINS AND COUPLING AGENTS AND METHODS FOR USE THEREOF

(71) Applicant: Corning Cable Systems LLC, Hickory, NC (US)

(72) Inventors: Edward John Fewkes, Corning, NY (US); John Paul Krug, Painted Post, NY (US); Ziwei Lui, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/799,255

(22) Filed: Mar. 13, 2013

Related U.S. Application Data

(60) Provisional application No. 61/713,788, filed on Oct. 15, 2012.

(51) Int. Cl.
*G02B 6/36* (2006.01)
*G03C 1/00* (2006.01)

(52) U.S. Cl.
USPC .......................................... 385/80; 430/270.1

(58) Field of Classification Search
USPC .......................................... 385/80; 430/270.1
See application file for complete search history.

(56) References Cited

U.S. PATENT DOCUMENTS

| | | | |
|---|---|---|---|
| 4,147,402 A | 4/1979 | Chown | 350/96.18 |
| 4,345,930 A | 8/1982 | Basola et al. | 65/102 |
| 4,510,005 A | 4/1985 | Nijman | 156/221 |
| 4,678,268 A | 7/1987 | Russo et al. | 350/96.18 |
| 4,859,827 A | 8/1989 | Coyle, Jr. et al. | 219/121.64 |
| 4,932,989 A | 6/1990 | Presby | 65/2 |
| 5,011,254 A | 4/1991 | Edwards et al. | 350/96.18 |
| 5,101,090 A | 3/1992 | Coyle, Jr. et al. | 219/121.68 |
| 5,226,101 A | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,631,986 A * | 5/1997 | Frey et al. | 385/78 |
| 5,772,720 A | 6/1998 | Taira-Griffin et al. | 65/387 |
| 5,954,974 A | 9/1999 | Broer et al. | 216/2 |
| 5,966,485 A | 10/1999 | Luther et al. | 385/85 |

(Continued)

FOREIGN PATENT DOCUMENTS

JP 62111216 A * 5/1987
WO 99/67316 12/1999

(Continued)

OTHER PUBLICATIONS

Jan. 21, 2014 Invitation to Pay Additional Fees issued in counterpart PCT International Application No. PCT/US2013/064007.

*Primary Examiner* — Charlie Peng

(57) ABSTRACT

An optical connector for terminating an optical fiber may include a ferrule, an optical fiber, and an adhesive composition. The ferrule may include a fiber-receiving passage defining an inner surface and the adhesive composition may be disposed within the ferrule and in contact with the inner surface of the ferrule and the optical fiber. The adhesive composition may include a partially cross-linked resin, where at least about 5% by weight of the partially cross-linked resin is cross-linked and at least about 5% by weight is not.

24 Claims, 1 Drawing Sheet

(56) References Cited

U.S. PATENT DOCUMENTS

| | | | | |
|---|---|---|---|---|
| 6,007,258 | A | * | 12/1999 | Marchitto et al. .............. 385/85 |
| 6,139,196 | A | | 10/2000 | Feth et al. ....................... 385/97 |
| 6,246,026 | B1 | | 6/2001 | Vergeest .................. 219/121.72 |
| 6,282,349 | B1 | | 8/2001 | Griffin ............................ 385/81 |
| 6,361,219 | B1 | | 3/2002 | Blyler, Jr. et al. .............. 385/85 |
| 6,413,450 | B1 | | 7/2002 | Mays, Jr. ..................... 264/1.27 |
| 6,492,443 | B1 | * | 12/2002 | Kodemura et al. ........... 524/114 |
| 6,509,547 | B1 | | 1/2003 | Bernstein et al. ........ 219/121.68 |
| 6,534,741 | B2 | | 3/2003 | Presby .................... 219/121.69 |
| 6,738,544 | B2 | | 5/2004 | Culbert et al. .................. 385/33 |
| 6,742,936 | B1 | | 6/2004 | Knecht et al. ................... 385/67 |
| 6,774,341 | B2 | | 8/2004 | Ohta ........................ 219/121.72 |
| 6,805,491 | B2 | | 10/2004 | Durrant et al. .................. 385/76 |
| 6,817,785 | B2 | | 11/2004 | Tian ................................ 385/96 |
| 6,822,190 | B2 | | 11/2004 | Smithson et al. ........ 219/121.69 |
| 6,825,440 | B2 | | 11/2004 | Ohta et al. ............... 219/121.69 |
| 6,886,991 | B2 | | 5/2005 | Endo ............................... 385/78 |
| 6,888,987 | B2 | | 5/2005 | Sercel et al. .................... 385/39 |
| 6,902,327 | B1 | | 6/2005 | Johnson .......................... 385/60 |
| 6,939,055 | B2 | | 9/2005 | Durrant et al. .................. 385/76 |
| 6,951,994 | B2 | | 10/2005 | Mays, Jr. ................. 219/121.67 |
| 6,955,478 | B2 | | 10/2005 | Durrant et al. .................. 385/76 |
| 6,957,920 | B2 | | 10/2005 | Luther et al. ................... 385/85 |
| 6,960,627 | B2 | | 11/2005 | Huth et al. ....................... 525/59 |
| 6,963,687 | B2 | | 11/2005 | Vergeest et al. ............... 385/123 |
| 6,968,103 | B1 | | 11/2005 | Schroll et al. .................... 385/30 |
| 7,014,790 | B1 | * | 3/2006 | Bulluck et al. ............. 252/182.18 |
| 7,023,001 | B2 | | 4/2006 | Cournoyer et al. ........ 250/492.1 |
| 7,029,187 | B2 | | 4/2006 | Chapman et al. ............... 385/96 |
| 7,082,250 | B2 | | 7/2006 | Jones et al. ................... 385/134 |
| 7,142,741 | B2 | | 11/2006 | Osborne .......................... 385/15 |
| 7,147,384 | B2 | | 12/2006 | Hardcastle et al. ............. 385/60 |
| 7,177,504 | B2 | * | 2/2007 | George et al. ................... 385/49 |
| 7,216,512 | B2 | | 5/2007 | Danley et al. ................... 65/392 |
| 7,264,403 | B1 | | 9/2007 | Danley et al. ................... 385/60 |
| 7,267,491 | B2 | | 9/2007 | Luther et al. ................... 385/85 |
| 7,306,376 | B2 | | 12/2007 | Scerbak et al. ................. 385/76 |
| 7,324,723 | B2 | | 1/2008 | Shioda et al. ................... 385/31 |
| 7,324,724 | B2 | | 1/2008 | Levesque et al. ............... 385/31 |
| 7,377,700 | B2 | | 5/2008 | Manning et al. ................ 385/72 |
| 7,419,308 | B2 | | 9/2008 | Ma .................................. 385/54 |
| 7,509,004 | B2 | | 3/2009 | Coleman ......................... 385/33 |
| 7,540,668 | B2 | | 6/2009 | Brown ............................ 385/78 |
| 7,630,609 | B1 | | 12/2009 | Mays, Jr. et al. .............. 385/137 |
| 7,695,201 | B2 | | 4/2010 | Douglas et al. ................. 385/85 |
| 7,802,927 | B2 | | 9/2010 | Benjamin et al. ............... 385/88 |
| 8,052,836 | B2 | | 11/2011 | Cale et al. ..................... 156/712 |
| 8,101,885 | B2 | | 1/2012 | Nakamae et al. ........ 219/121.77 |
| 8,104,974 | B1 | | 1/2012 | Gurreri ............................ 385/72 |
| 8,109,679 | B2 | | 2/2012 | Danley et al. ................... 385/85 |
| 8,132,971 | B2 | | 3/2012 | Luther et al. ................... 385/83 |
| 2004/0008951 | A1 | * | 1/2004 | Endo ............................... 385/78 |
| 2004/0047567 | A1 | * | 3/2004 | Gimbel et al. .................. 385/80 |
| 2004/0234211 | A1 | | 11/2004 | Durrant et al. .................. 385/88 |
| 2005/0008307 | A1 | | 1/2005 | Culbert et al. ................. 385/123 |
| 2005/0213891 | A1 | * | 9/2005 | Hardcastle et al. ............. 385/60 |
| 2005/0284852 | A1 | | 12/2005 | Vergeest et al. .......... 219/121.67 |
| 2006/0137403 | A1 | | 6/2006 | Barr et al. ...................... 65/377 |
| 2006/0266743 | A1 | | 11/2006 | Chi et al. .................. 219/121.69 |
| 2008/0067158 | A1 | | 3/2008 | Levesque ................. 219/121.72 |
| 2009/0279829 | A1 | * | 11/2009 | Popp et al. ...................... 385/25 |
| 2009/0296193 | A1 | * | 12/2009 | Bita et al. ...................... 359/291 |
| 2010/0101277 | A1 | | 4/2010 | Gonthier et al. ................ 65/392 |
| 2010/0215319 | A1 | | 8/2010 | Childers et al. ................ 385/60 |
| 2010/0303416 | A1 | | 12/2010 | Danley et al. ................... 385/55 |
| 2012/0014649 | A1 | | 1/2012 | Duis et al. ....................... 385/65 |
| 2012/0027356 | A1 | | 2/2012 | Gurreri ............................ 385/60 |
| 2012/0027358 | A1 | | 2/2012 | Webb et al. ..................... 385/78 |

FOREIGN PATENT DOCUMENTS

| | | | | |
|---|---|---|---|---|
| WO | 01/61394 | A1 | 8/2001 | ............... G02B 6/26 |
| WO | 01/61395 | A1 | 8/2001 | ............... G02B 6/26 |
| WO | 01/61870 | A2 | 8/2001 | |
| WO | 2004/003612 | A1 | 1/2004 | ............... G02B 6/25 |
| WO | 2008/103239 | A1 | 8/2008 | ............. B23K 26/00 |

* cited by examiner

ADHESIVE COMPOSITIONS INCLUDING PARTIALLY CROSS-LINKED RESINS AND COUPLING AGENTS AND METHODS FOR USE THEREOF

RELATED APPLICATIONS

This application claims the benefit of priority under 35 U.S.C. §119 of U.S. Provisional Application Ser. No. 61/713,788 filed on Oct. 15, 2012 the content of which is relied upon and incorporated herein by reference in its entirety.

BACKGROUND

1. Field

The present disclosure generally relates to materials and methods for adhering parts within optical connectors, and more specifically to adhesive compositions for use in adhering optical fibers to ferrules within optical connectors, and the methods for use thereof.

2. Technical Background

In the assembly of optical connectors, adhesives may be used to bond optical fibers to ferrules. The adhesives may typically be thermoset resins, such as epoxies. The present inventors have recognized that a need exists for an optical fiber adhesive with enhanced bonding properties.

BRIEF SUMMARY

The concepts of the present disclosure are generally applicable to adhesive compositions for use in adhering optical fibers to ferrules within optical connectors, and the methods for use thereof. In accordance with one embodiment of the present disclosure, an optical connector for terminating an optical fiber may comprise a ferrule, a stub optical fiber, and an adhesive composition. The ferrule may comprise a fiber-receiving passage defining an inner surface and the adhesive composition may be disposed within the ferrule and in contact with the inner surface of the ferrule and the stub optical fiber. The adhesive composition may comprise a partially cross-linked resin and a coupling agent. The adhesive composition may comprise between about 0.1 to about 10 parts by weight of the coupling agent per 100 parts by weight of the partially cross-linked resin.

In accordance with another embodiment of the present disclosure a ferrule adhesion system may be used in an optical connector for terminating an optical fiber. The ferrule adhesion system may comprise a ferrule and an adhesive composition. The ferrule may comprise a fiber-receiving passage defining an inner surface and the adhesive composition may be disposed within the ferrule and in contact with the inner surface of the ferrule. The adhesive composition may comprise a partially cross-linkable resin and a coupling agent. The coupling agent may comprise at least one of an alkoxysilane, an oxime silane, an acetoxy silane, a zirconate, a titanate, a silane with an epoxy ring on one end and trimethoxy functional group at the other end, or combinations thereof. The adhesive composition may comprise between about 0.1 to about 10 parts by weight of the coupling agent per 100 parts by weight of the partially cross-linked resin.

In accordance with yet another embodiment of the present disclosure, a method for securing a stub optical fiber to a ferrule of an optical connector, may comprise the steps of supplying a ferrule adhesion system, the ferrule adhesion system comprising the ferrule and an adhesive composition, heating the adhesive composition to a temperature sufficient to melt the adhesive composition, inserting the stub optical fiber into a fiber-receiving passage defining an inner surface of the ferrule and into contact with the adhesive composition, and cooling the adhesive composition. The adhesive composition may be disposed within the ferrule and in contact with the inner surface of the ferrule. The adhesive composition may comprise a partially cross-linkable resin and a coupling agent prior to the heating step. The adhesive composition may comprise between about 0.1 to about 10 parts by weight of the coupling agent per 100 parts by weight of the partially cross-linkable resin.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
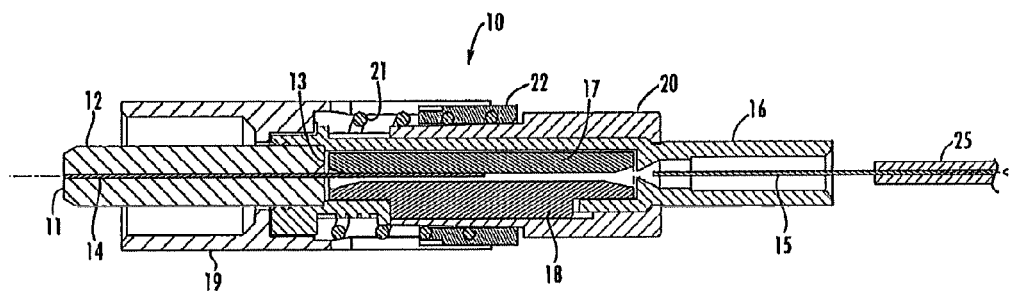
FIG. 1 is a lengthwise cross-sectional view of a fiber optic mechanical splice connector to be mounted on an end portion of a field optical fiber.

Reference will now be made in greater detail to various embodiments, some embodiments of which are illustrated in the accompanying drawings. Whenever possible, the same reference numerals will be used throughout the drawings to refer to the same or similar parts. Generally, disclosed herein are various embodiments of adhesive compositions for use in adhering optical fibers to ferrules within optical connectors, and the methods for use thereof. The various embodiments of adhesive compositions described herein may provide desirable properties, such as, but not limited to, high adhesion strength and/or improved performance following environmental aging. Various embodiments of the adhesive compositions disclosed herein may also have other desirable properties for the process of securing an optical fiber within a ferrule, such as, but not limited to, shortened process cycle time, no required mixing, and/or no potlife issues.

Figures 2, 3:
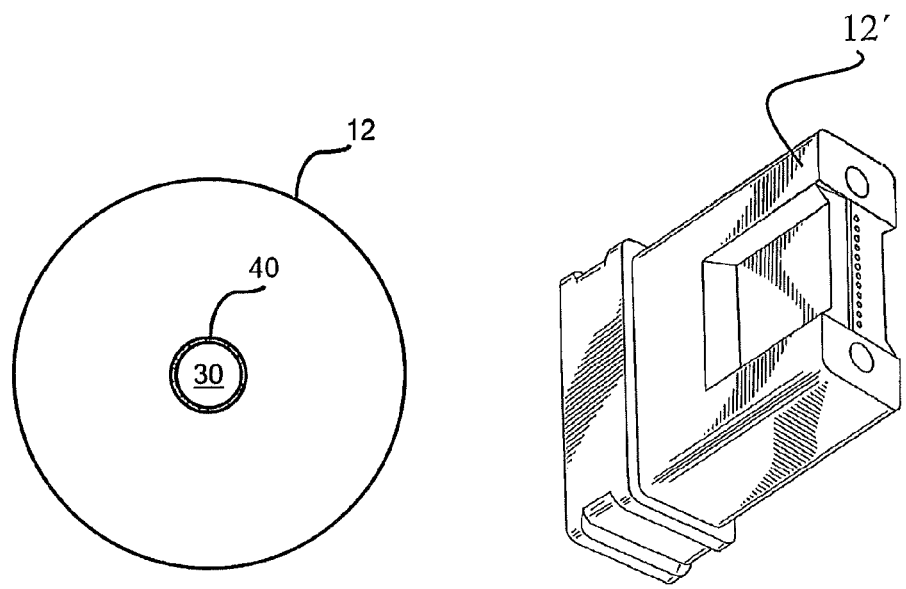
FIG. 2 illustrates a fiber-receiving passage of a connector ferrule.
FIG. 3 is a perspective view of a ferrule according to another exemplary embodiment.
Figure 4:
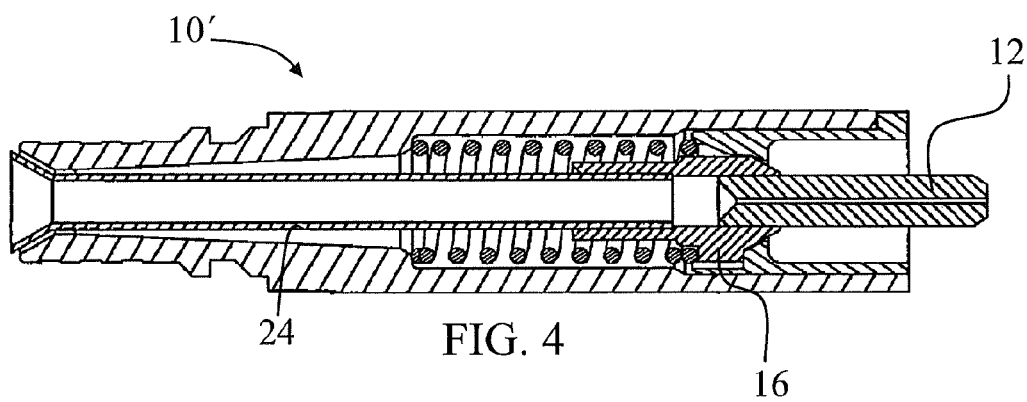
FIG. 4 is a lengthwise cross-sectional view of a connector according to another exemplary embodiment.

Referring to FIG. 1, a field-installable, mechanical splice fiber optic connector 10 suitable for use with the present technology is shown. The fiber optic connector 10 may include features similar to those of a member of the UNI-CAM® family of mechanical splice connectors available from Corning Cable Systems, LLC of Hickory, N.C. While one embodiment of a fiber optic connector is depicted in FIG. 1, it should be understood that the adhesive compositions and methods for adhering a glass fiber to a ferrule as described herein are applicable to any fiber optic connector of any design. Such fiber optic connectors include, but are not limited to, single-fiber (see, e.g., ferrule 12 of connectors 10, 10' as shown in FIGS. 1 and 4) or multi-fiber (see, e.g., ferrule 12' as shown in FIG. 3) connectors, such as fusion splice or mechanical splice connectors. Examples of typical single fiber mechanical splice connectors are provided in U.S. Pat. Nos. 4,755,018; 4,923,274; 5,040,867; and 5,394,496. Examples of typical multi-fiber mechanical splice connectors are provided in U.S. Pat. Nos. 6,173,097; 6,379,054; 6,439,780; and 6,816,661.

As is illustrated with further reference to FIG. 2, the mechanical splice connector 10 includes a connector ferrule 12 defining a lengthwise, longitudinal bore, referred to herein as a fiber-receiving passage 30. The fiber-receiving passage 30, which is illustrated in exaggerated scale in FIG. 2, defines an inner surface of the ferrule 12, which may be contacted with an adhesive composition 40 to secure an optical fiber, such as a stub optical fiber 14. The adhesive composition 40 may be disposed within the ferrule 12 and in contact with the inner surface of the ferrule 12 and the stub optical fiber 14. Various embodiments of the adhesive composition 40, including variations of adhesive compositions are described in detail herein. In various embodiments, the adhesive composition 40 may generally comprise a partially cross-linked resin and a coupling agent, as is described in detail herein.

The ferrule 12 may typically comprise a ceramic material, such as, but not limited to, zirconia, alumina, titanium-doped alumina, glass-filled PPS, or combinations thereof. However, other materials of construction of the ferrule are contemplated herein, such as metals, ceramics, polymers, or combinations thereof.

The stub optical fiber 14 may be a flexible, transparent optical fiber made of glass or plastic. It may function as a waveguide to transmit light between the two ends of the optical fiber. Optical fibers typically include a transparent core surrounded by a transparent cladding material with a lower index of refraction. Light may be kept in the core by total internal reflection. Glass optical fibers may comprise silica, but some other materials, such as fluorozirconate, fluoroaluminate, and chalcogenide glasses, as well as crystalline materials, such as sapphire, may be used. Although shown as the stub fiber 14 in FIG. 1, in other embodiments optical fibers that are not stub fibers may be included and used in combination with the ferrule 12, 12' and processes disclosed herein.

The light may be guided down the core of the optical fiber 14 by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber 14 during the drawing process. The coatings may protect the strands of glass fiber. The optical fiber 14 may comprise an inner primary coating and an outer secondary coating. Optical fiber coatings may be applied in concentric layers.

Still referring to FIG. 1, the forward end (also referred to herein as the end face) 11 of the ferrule 12 is typically precision polished such that the stub optical fiber 14 is flush with (as shown) or slightly protruding from the end face of the ferrule 12. However, the stub optical fiber 14 may also protrude outwardly from the end face 11 of the ferrule 12 a predetermined distance, if desired. Furthermore, the end face 11 may be oriented generally perpendicular to the optical fiber receiving passage to provide an Ultra Physical Contact (UPC) type connector, or may be formed at a predetermined angle to provide an Angled Physical Contact (APC) type connector, in a know manner. In addition, although a single fiber ferrule 12 is shown for purposes of convenience, the ferrule 12 may define a plurality of lengthwise optical fiber receiving passages therethrough for receiving a corresponding plurality of stub optical fibers to provide a multi-fiber mechanical splice connector or other multi-fiber connector (see generally multi-fiber ferrule 12' as shown in FIG. 3 for a multi-fiber connector).

Generally, the rear end 13 of the ferrule 12 is inserted into and secured within the forward end of a ferrule holder 16 so that the stub optical fiber 14 extends rearwardly a predetermined distance from the ferrule between a pair of opposed splice components 17, 18, disposed within the ferrule holder. In turn, the ferrule holder 16, including the ferrule 12 and splice components 17, 18 is disposed within a connector housing 19. A cam member 20 is movably mounted between the ferrule holder 16 and the connector housing 19 for engaging a keel portion of the lower splice component 18, as will be described. If desired, the ferrule 12, the ferrule holder 16 and the cam member 20 may be biased relative to the connector housing 19, for example by a coil spring 21, to ensure physical contact between the end face 11 of the ferrule 12 and the end face of an opposing ferrule in a mating fiber optic connector or optical device. Finally, a spring retainer 22 may be disposed between the connector housing 19 and a medial portion of the cam member 20 and fixed to the connector housing so as to retain one end of the spring 21 relative to the connector housing. As a result, the ferrule 12, the ferrule holder 16 and the cam member 20 are biased forwardly, yet permitted to piston rearwardly relative to the connector housing 19.

As illustrated by the horizontal directional arrow in FIG. 1, a field optical fiber 15 may be inserted into the rear end of the ferrule holder 16 opposite the ferrule 12 and the stub optical fiber 14. Although not required, the mechanical splice connector 10 may be provided with a means, for example a lead-in tube 24 (FIG. 4), for guiding the field optical fiber 15 into the ferrule holder 16 and between the splice components 17, 18 in general alignment with the stub optical fiber 14. Preferably, at least one of the splice components 17, 18 has a groove formed therein for receiving the stub optical fiber 14 and the field optical fiber 15. As shown herein, the lower splice component 18 is provided with a lengthwise V-shaped groove for receiving and guiding the stub optical fiber 14 and the field optical fiber 15 into fine alignment. Typically, the field optical fiber 15 is coated or tight-buffered with a buffer 25 that is stripped back to expose a predetermined length of the end of the field optical fiber. The mechanical splice connector 10 may be further provided with a crimp tube or other strain relief mechanism (not shown) for retaining and strain relieving the buffer 25 of the field optical fiber 15. With the buffer 25 removed, the field optical fiber 15 can be inserted and advanced into the rear of the mechanical splice connector 10 between the splice components 17, 18 until the end portion of the field optical fiber 15 makes physical contact with the end portion of the stub optical fiber 14. The cam member 20 is actuated by moving or rotating the cam member 20 relative to the ferrule holder 16 about the longitudinal axis of the connector 10, to engage the keel on the splice component 18 and thereby force the lower splice component 18 in the direction of the upper splice component 17. Movement of the lower splice component 18 causes the end portion of the stub optical fiber 14 and the end portion of the field optical fiber 15 to seat within the V-shaped groove formed in the lower splice component 18, thereby aligning and simultaneously securing the field optical fiber 15 relative to the stub optical fiber 14 between the splice components. Accordingly, the field optical fiber 15 is optically coupled to the stub optical fiber 14. Further, as used herein, the portion of the connector where the optical coupling results is referred to as a "termination area." In other embodiments, the field optical fiber 15 or another optical fiber may be inserted into the ferrule directly, and attached thereto as disclosed herein, in place of the stub fiber 14.

Generally, it should be understood that the adhesive compositions described herein may have application in adhering an optical fiber with any part of an optical connector, and are not limited to the adhesion of a stub optical fiber to the inner wall of the ferrule. For example, the adhesive compositions described herein may be used to bond any part of an optical connector to any optical fiber connected thereto, including the stub optical fiber and field optical fiber.

Also described herein are ferrule adhesion systems for use in an optical connector for terminating an optical fiber. The ferrule adhesion system may comprise a ferrule 12 comprising a fiber-receiving passage 30 defining an inner surface and an adhesive composition 40 disposed within the ferrule 12 and in contact with the inner surface of the ferrule 12. Various embodiments of the adhesive composition 40 of the ferrule adhesion systems are described in detail herein. Such an adhesion system may contain the adhesive composition for a long period of time before heating to bond the fiber within the ferrule, such as 8 hours, 16 hours, 1 day, 1 week, 1 month, 6 months, 1 year, or even several years. For example, the adhesive composition 40 may be in a solid powder form, such as packed within the fiber-receiving passage 30 prior to being heated or otherwise activated and/or cured (e.g., via chemical catalyzing). Alternatively, the adhesive composition may be in a molded solid form in the fiber-receiving passage 30 and then may be heated prior to the insertion of the optical fiber.

Generally, methods for securing stub optical fibers to ferrules of optical connectors 10 are disclosed herein. The method may generally comprise the steps of supplying a ferrule adhesion system, heating the adhesive composition to a temperature sufficient to melt the adhesive composition, inserting the optical fiber into the fiber-receiving passage of the ferrule and into contact with the adhesive composition, and cooling the adhesive composition.

The ferrule with an adhesive composition disposed within may be heated to melt the adhesive composition to allow for the optical fiber to slide into the opening of the ferrule. The heating may be at an elevated temperature, such as to allow for cross linking or other chemical reactions to occur within some embodiments of the adhesive composition. Heating may be performed by a laser (e.g., commercially-available, industrial $CO_2$ laser with at least 100 W capacity), or any other heating process. The heating step may take less than about 15 seconds with a laser, such as even less than 10 seconds, less than 8 seconds, or less than 6 seconds. The adhesive composition may then be allowed to cool by any process, such as by accelerated cooling or through simple cooling in an ambient atmosphere at or near room temperature. The cooled adhesive composition is set and may stably adhere the optical fiber to the ferrule. In some embodiments, the ferrule and adhesive composition may substantially cool as to set the adhesive composition within 5 minutes, 2 minutes, 1 minute, 30 seconds, or even 15 seconds in room temperature air (25° C.) at sea level pressure and zero humidity.

Various embodiments of adhesive compositions will now be disclosed herein. As used herein, an "adhesive" is a substance capable of holding materials together by surface attachment. In one embodiment, the adhesive composition may generally comprise a partially cross-linked resin and a coupling agent. In some embodiments, there may be between about 0.1 to about 10 parts by weight of the coupling agent per 100 parts by weight of the partially cross-linked resin. In various embodiments, there may be about 0.1, about 0.5, about 1, about 2, about 4, about 6, about 8, or about 10 parts by weight of the coupling agent per 100 parts by weight of the partially cross-linked resin, or a range between any combination of the above mentioned weight ratios.

As used herein, a "thermoplastic resin" is a material that comprises a polymeric material that will repeatedly soften when heated and harden when cooled, without polymer chains cross-linking. For example, a thermoplastic resin may be repeatedly made soft and hard through heating and cooling cycles. As used herein, "cross-linking" or "cross-linked" refers to the chemical bonding that connects a polymer chain to an adjacent polymer chain, and "cross-linkable" describes a chemical species that becomes at least partially cross-linked when sufficient heat is applied. As used herein, "partially cross-linking" or "partially cross-linked" refers to chemical bonding that connects a polymer chain to an adjacent polymer chain where not all adjacent chains are bonded, in contrast to thermoplastic and thermoset resins; and "partially cross-linkable" describes a chemical species that becomes partially cross-linked when sufficient heat is applied. It should be understood that when the terms "partially cross-linked" and "partially cross-linkable" are used to describe polymers of adhesive compositions described herein, the same resin is being described at a specific time of prior to cross linking or following cross-linking. For example, the resin is described as partially cross-linkable when it is packed into the ferrule and has not yet been heated to be partially cross-linked. Following heating, the resin may be partially cross-linked. In another embodiment, the resin may be cross-linked prior to the heating step immediately prior to the insertion of the optical fiber, such as if the adhesive composition is injection molded prior to being placed into the ferrule. However, an injection molded adhesive composition may still be described as partially cross-linkable, as cross-linking may take place in the heating step immediately prior to optical fiber insertion. It should further be understood that when the adhesive composition is described herein, if the adhesive composition is said to comprise a partially cross-linked resin then that is equivalent to saying that the adhesive composition comprises a partially cross-linkable resin prior to that cross linking step. While cross-linking may provide a permanence to fix structures securely together during connector assembly and thermoplastic resins may allow for materials to flow in a controlled manner for ferrule manufacturing, partially cross-linking materials may uniquely and synergistically have such advantages of both types of materials.

In one embodiment, the adhesive composition may comprise the property that at least about 5% by weight of the resin is cross-linked or cross-linkable and at least about 5% by weight of the resin is not cross-linked or cross-linkable. In another embodiment, the adhesive composition may comprise the property that at least about 10% by weight of the resin is cross-linked or cross-linkable and at least about 10% by weight of the resin is not cross-linked or cross-linkable. In another embodiment, the adhesive composition may comprise the property that at least about 20% by weight of the resin is cross-linked or cross-linkable and at least about 20% by weight of the resin is not cross-linked or cross-linkable.

In some embodiments, the partially cross-linked resin materials may have a melting point at temperatures of at least about 250° C., 270°, or 290° C. In some embodiments, the partially cross-linked resin materials may crosslink in the presence of air at temperatures of at least about 300° C., 325° C., or 350° C. Additionally, the partially cross-linked resin may be capable of bonding in less than about 5 minutes, 3 minutes, 1 minute, 30 seconds, or even 15 seconds. In contemplated embodiments, the partially cross-linked resin does not require mixing, does not de-air, and/or does not have potlife issues. In one embodiment, the adhesive composition may comprise one or more partially cross-linked resins such as, but not limited to, a partially cross-linked poly(phenylene sulfide).

In other embodiments, the adhesive composition may comprise one or more partially or non-partially cross-linked resins such as, but not limited to, a poly(phenylene oxide), a polyamide-imide, a liquid crystal polymer, a polyether ether ketone, a cyclic olefin copolymer, or combinations thereof. For example, the poly(phenylene sulfide) may comprise, but is not limited to, Ryton® V-1, available from Chevron Phillips Chemical Company LLC of The Woodlands, Tex., or Fortron® 0205P4 or Fortron® 0203P6, available from Ticona GmbH of Frankfurt, Germany. The poly(phenylene oxide) may comprise, but is not limited to, Sabic SA-102, available from SABIC of Riyadh, Saudi Arabia. The liquid crystal polymer may comprise Veectra® A950 VF3001, available from Ticona of Florence, Ky. The polyether ether ketone may comprise Ketaspire® KT-851, available from Solvay S.A. of Brussels, Belgium. The cyclic olefin copolymer may comprise TOPAS® 5013L-10 from Topas Advanced Polymers.

The coupling agent may comprise a wide variety of one or more suitable coupling agents. In one embodiment, the coupling agent may comprise an epoxy, amino, or mercapto-functional silane. The silane group on the coupling agent may comprise an alkoxysilane, an oxime silane, an acetoxy silane. Alternatively, or in combination with the above mentioned silane coupling agent, the coupling agent may comprise a zirconate, a titanate, or combinations thereof. In one embodiment, the coupling agent may comprise glycidoxypropyl trimethoxysilane, such as gamma-glycidoxypropyltrimethoxy silane. For example, the coupling agents may comprise Silquest® A-187, Silquest® A-1100, available from Crompton Corp. of Middlebury, Conn., or Ken-React® KR55, available from Kenrich Petrochemicals, Inc. of Bayonne, N.J.

The combination of a coupling agent and a partially cross-linked resin may produce enhanced adhesion strength. Without being bound by theory, it is believed that the coupling agent may provide a chemical coupling between the inorganic surface of the optical fiber and/or the ferrule, and the polymer matrix of the adhesive. After cooling, the partially cross-linked resin, which may have no functional groups which can react with inorganic surfaces, may be covalently bonded to one or both of the optical fiber or ferrule by the coupling agent. The coupling agent may comprise functional groups specifically capable of bonding covalently to inorganic materials, and groups specifically capable of reacting with organic functional groups. The organic functional group on the coupling agent can comprise epoxy, amino, mercapto, acrylic ester or any other organic functional group. In one embodiment, the functional group on the coupling agent which reacts with the inorganic materials is an alkoxysilane. Other possible groups include an oxime- or acetoxy-silane. In addition to silane coupling agents, zirconates and titanates have also been shown to have such coupling capabilities.

The adhesive composition described herein may further comprise at least one thermoset resin. A wide variety of thermoset resin materials may be used as a component of the adhesive composition. As used herein, a "thermoset resin" is a material that comprises at least one polymeric material that will undergo or has undergone a chemical reaction by the action of heat, catalysts, ultraviolet light, etc., leading to a relatively infusible state. Examples of suitable thermoset resins may include, but is not limited to, epoxy resins, such as Bisphenol A based epoxy or epoxy novolacs. In one embodiment, there may be between about 1 to about 85 parts by weight of the thermoset resin per 100 parts by weight of the partially cross-linked resin. In various embodiments, there may be about 1, about 5, about 10, about 30, about 50, about 70, about 80, or about 85 parts by weight of the thermoset resin per 100 parts by weight of the partially cross-linked resin, or a range between any combination of the above mentioned weight ratios.

The combination of a thermoset resin and a partially cross-linked resin may produce enhanced adhesion strength. Without being bound by theory, it is believed that after cure at temperature above 300° C., the adhesive may form a uniform system of thermoplastics and a cross linked network structures throughout the matrix. The cross-link structure may be formed not only by the thermoset but also between thermoplastics and thermoset. For example, the partially cross-linked thermoplastic resin could react with the thermoset resin at elevated temperatures by a phenol group at the end of the polymer chain. The formed network structure may improve integrity of the adhesives and corresponding fiber optic connectors to resist environmental aging and creep under shear stress and promote bonding strength on the substrates.

In one embodiment, the adhesive composition may further comprise a curing agent. Without being bound by theory, it is believed that the curing agent may aid in curing the thermoset resin, such as an epoxy resin, if the adhesive composition comprises a thermoset resin, and/or may aid in curing the coupling agent. For example, the curing agent may react with the epoxy groups of a coupling agent and/or thermoset resin. The curing agent may comprise one or more curing agents available, such as, but not limited to, an anhydride curative, an amide curative, an aromatic amine curative, a dianhydride, a mono acid anhydride, a guanidine compound, an amine curative, or combinations thereof. For example, the curing agent may comprise a dicyandiamide, pyromellitic dianhydride, a dodecylsuccinic anhydride, a urone, a urea, a melamine, a dicyandiamide, or combinations thereof. In one embodiment, the adhesive composition further comprises between about 0.2 to about 50 parts by weight of a curing agent per 100 parts by weight of the coupling agent. In various embodiments, there may be about 0.2, about 0.5, about 1, about 5, about 10, about 20, about 30, about 40, or about 50 parts by weight of the curing agent per 100 parts by weight of the coupling agent, or a range between any combination of the above mentioned weight ratios. In another embodiment, the adhesive composition further comprises between about 0.2 to about 50 parts by weight of a curing agent per 100 parts by weight of the thermoset resin. In various embodiments, there may be about 0.2, about 0.5, about 1, about 5, about 10, about 20, about 30, about 40, or about 50 parts by weight of the curing agent per 100 parts by weight of the thermoset resin, or a range between any combination of the above mentioned weight ratios. In yet another embodiment, the adhesive composition further comprises between about 0.2 to about 100 parts by weight of a curing agent per 100 parts by weight of the sum of the weight of the thermoset resin and the weight of the coupling agent. In various embodiments, there may be about 0.2, about 0.5, about 1, about 5, about 10, about 30, about 50, about 70, about 90, or about 100 parts by weight of the curing agent per 100 parts by weight of the sum of the weight of the thermoset resin and the weight of the coupling agent, or a range between any combination of the above mentioned weight ratios.

In one embodiment, the adhesive composition may further comprise one or more filler materials. In one embodiment, the filler material is a mineral composition, such as at least one pyrophosphate of a metal. For example, the metal may comprise cobalt or magnesium, such that the filler material is magnesium pyrophosphate, cobalt pyrophosphate, or combinations thereof. In one embodiment, the adhesive composition further comprises between about 0.5 to about 85 parts by weight of a filler material per 100 parts by weight of the partially cross-linked resin. In various embodiments, there may be about 0.5, about 1, about 5, about 10, about 30, about 50, about 70, about 80, or about 85 parts by weight of the filler material per 100 parts by weight of the thermoset resin, or a range between any combination of the above mentioned weight ratios.

In one embodiment, the filler material may comprise a material with a negative coefficient of thermal expansion. As used herein, a material with a negative coefficient of thermal expansion refers to a material that goes through a phase inversion with the accompanying decrease in volume at a temperature near to, for example within about 50° C., about 30° C., about 20° C., or about 10° C., of the glass transition temperature of the partially cross-linked resin. Without being bound by theory, it is believed that the inclusion of a material with a negative coefficient of thermal expansion may aid in maintaining the density, and therefore the volume, of the adhesive composition when it is heated, such that it does not expand as to apply excessive pressure to the ferrule, in some circumstances causing the ferrule to crack or rupture.

It should be understood that various components of the adhesive composition embodiments disclosed herein may be combined in any combination in any ratio disclosed herein. Such various components include partially cross-linked thermoplastic resins, coupling agents, thermoset resins, curing agents, and filler materials. Furthermore, while desirable properties of the adhesive composition may be caused by the combination of only two or more of the various components, any combination of the components is contemplated herein. It should further be understood that where a component of the adhesive composition is referenced, it may be an optional component is some embodiments, and is not required to be in the adhesive composition is all embodiments.

For example, in one preferred embodiment, the adhesive composition may comprise a partially cross-linked resin, a coupling agent, curing agent, and partially cross-linked resin. The adhesive composition may comprise between about 0.1 to about 10 parts by weight of the coupling agent per 100 parts by weight of the partially cross-linked resin, between about 0.2 to about 5 parts by weight of a curing agent per 100 parts by weight of the partially cross-linked resin, and between about 0.5 to about 85 parts by weight of a filler material per 100 parts by weight of the partially cross-linked resin.

In one embodiment, the adhesive composition is prepared as a solid powder. At least some of the various components of the adhesive composition may be solid, and may be ground into a powder, such as any or all of the partially cross-linked resin, the thermoset resin, the curing agent, and/or the filler material. The solid powder materials may be thoroughly mixed. In one embodiment, the coupling agent may be a liquid. However, the fraction of coupling agent in the blend is relatively small so the coupling agent may be combined with one of the solid components of the adhesive composition and the resulting blend may a free-flowing powder. For example, in one embodiment, the coupling agent may be pre-reacted with the thermoplastic powders in an organic solvent under refluxing conditions. After removal of the solvent, the treated powder remains. Under the conditions of refluxing solvent, some of the coupling agent may have become permanently bonded to the polymer.

In some embodiments, the adhesive composition may be in the form of a solid powder and may be directly packed into the fiber receiving passage of the ferrule (shown in FIG. 1 as the space occupied by the stub optical fiber 14 within the ferrule 12). In some other embodiments, particularly when the adhesive composition does not comprise a thermoset resin, the adhesive composition may be extruded or injection molded into preforms as solid material following an initial heating step. Adhesive compositions comprising a thermoset resin may not be capable of being extruded or injection molded into preforms because they may not be capable of being heated again while within the ferrule to receive and bond the stub optical fiber. As such, a partially cross-linking resin may provide advantages of both thermoset and thermoplastic resins.

EXAMPLE

An adhesive composition was prepared with poly(phenylene sulfide) (Ryton® V-1) and Gamma-Glycidoxypropyltrimethoxy silane, an epoxy silane, using 1.5 parts by weight of Gamma-Glycidoxypropyltrimethoxy silane per 100 parts by weight of poly(phenylene sulfide). The coupling agent was pre-reacted for 8 hours with the partially cross-linkable powders in a mixture containing 99% organic solvent and 1% Gamma-Glycidoxypropyltrimethoxy silane under refluxing conditions. A filler material of pyromellitic dianhydride was also mixed into the adhesion composition at a weight ratio of 0.5 per 100 parts of poly(phenylene sulfide). The resultant adhesive composition was a free flowing powder that was thereafter packed into the fiber receiving passage of a ferrule. The ferrule and adhesive composition were then heated with a laser until the adhesive composition melted, and an optical fiber was inserted into the fiber receiving passage. The ferrule and adhesive composition were then cooled through exposure to ambient conditions.

Adhesion strength was analyzed with a Chatillon tensile test set. The fiber was wrapped around a mandrel then pull vertically until the fiber broke or the bond failed. The tensile peak was recorded. The ferrule bonded to the optical fiber was also tested under exposure to 2 day and 7 day environmental conditions. A control group was also used that was not exposed the environmental conditions. The samples that were aged under environmental conditions went through an environmental cycling regime consisting of a 6 hour cycle that consisted of 2 hours at about 22° C., 2 hours of temperature moving linearly from about 22° C. to about −40° C., 2 hours at about −40° C., 2 hours of temperature moving linearly from about −40° C. to about 85° C., 2 hours at about 85° C. and about 90% humidity, and 2 hours of temperature moving linearly from about 85° C. to about 22° C. 2 day environmental tests samples went through 8 cycles and 7 day environmental test samples went through 28 cycles. The adhesion strength data is shown below for the adhesive composition described above as well as other various comparative samples:

| Adhesive Composition | Environmental Cycling | Peak Tensile Strength (lbf) |
|---|---|---|
| 100% Locite epoxy | none | 4.0 |
| 100% poly(phenylene sulfide) | none | 3.1 |
| 100% poly(phenylene sulfide) | 2 days | 2.5 |
| poly(phenylene sulfide), gamma-glycidoxypropyltrimethoxy silane, pyromellitic dianhydride (100:1.5:.0.5 wt. ratio) | none | 6.5 |
| poly(phenylene sulfide), gamma-glycidoxypropyltrimethoxy silane, pyromellitic dianhydride (100:1.5:.0.5 wt. ratio) | 2 days | 5.0 |
| poly(phenylene sulfide), gamma-glycidoxypropyltrimethoxy silane, pyromellitic dianhydride (100:1.5:.0.5 wt. ratio) | 7 days | 4.5 |

For the purposes of describing and defining the present disclosure it is noted that the term "about" are utilized herein to represent the inherent degree of uncertainty that may be attributed to any quantitative comparison, value, measurement, or other representation. The term "about" are also utilized herein to represent the degree by which a quantitative representation may vary from a stated reference without resulting in a change in the basic function of the subject matter at issue.

It is noted that terms like "preferably," "commonly," and "typically," when utilized herein, are not utilized to limit the scope of the claims or to imply that certain features are critical, essential, or even important to the structure or function of the claims. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

What is claimed is:

1. An optical connector for terminating an optical fiber, the optical connector comprising:
a ferrule, wherein the ferrule comprises a fiber-receiving passage defining an inner surface;
an optical fiber, extending through the fiber-receiving passage, and
an adhesive composition, wherein the adhesive composition is disposed within the fiber-receiving passage of the ferrule and is in contact with the inner surface of the ferrule and the optical fiber, wherein the adhesive composition comprises:
a partially cross-linked resin that is a polymer; and
a coupling agent that provides chemical coupling between the polymer and at least one of the optical fiber and the ferrule, wherein the adhesive composition comprises between about 0.1 to about 10 parts by weight of the coupling agent per 100 parts by weight of the partially cross-linked resin.

2. The optical connector of claim 1, wherein at least about 5% by weight of the partially cross-linked resin is cross-linked and at least about 5% by weight of the partially cross-linked resin is not cross-linked.

3. The optical connector of claim 1, wherein the partially cross-linked resin has a melting point of at least about 290° C.

4. The optical connector of claim 1, wherein the adhesive composition further comprises between about 0.2 to about 50 parts by weight of a curing agent per 100 parts by weight of the coupling agent, and wherein the curing agent comprises at least one of an anhydride curative, an amine curative, an aromatic amine curative, or combinations thereof.

5. The optical connector of claim 1, wherein the adhesive composition further comprises between about 1 to about 85 parts by weight of a thermoset resin per 100 parts by weight of the partially cross-linked resin.

6. The optical connector of claim 5, wherein the thermoset resin is an epoxy resin.

7. The optical connector of claim 1, wherein the adhesive composition further comprises between about 0.5 to about 85 parts by weight of a filler material per 100 parts by weight of the partially cross-linked resin.

8. The optical connector of claim 7, wherein the filler material comprises a mineral composition, wherein the mineral composition comprises at least one pyrophosphate of a metal and, wherein the metal is cobalt or magnesium.

9. The optical connector of claim 7, wherein the filler material comprises a material with a negative coefficient of thermal expansion at or near a melting point of the partially cross-linked resin.

10. The optical connector of claim 1, wherein the coupling agent comprises at least one of an alkoxysilane, an oxime silane, an acetoxy silane, a zirconate, a titanate, a silane with an epoxy ring on one end and trimethoxy functional group at the other end, or combinations thereof.

11. An optical connector for terminating an optical fiber, the optical connector comprising:
a ferrule, wherein the ferrule comprises a fiber-receiving passage defining an inner surface;
an optical fiber, extending through the fiber-receiving passage, and
an adhesive composition, wherein the adhesive composition is disposed within the fiber-receiving passage of the ferrule and is in contact with the inner surface of the ferrule and the optical fiber, wherein the adhesive composition comprises:
a partially cross-linked resin, wherein the partially cross-linked resin is a polymer and comprises poly(phenylene sulfide); and
a coupling agent that provides chemical coupling between the polymer and at least one of the optical fiber and the ferrule, wherein the adhesive composition comprises between about 0.1 to about 10 parts by weight of the coupling agent per 100 parts by weight of the partially cross-linked resin.

12. The optical connector of claim 11, wherein the coupling agent comprises at least one of an alkoxysilane, an oxime silane, an acetoxy silane, a zirconate, a titanate, a silane with an epoxy ring on one end and trimethoxy functional group at the other end, or combinations thereof.

13. The optical connector of claim 12, wherein the adhesive composition further comprises between about 0.2 to about 50 parts by weight of a curing agent per 100 parts by weight of the coupling agent, and wherein the curing agent comprises at least one of an anhydride curative, an amine curative, an aromatic amine curative, or combinations thereof.

14. The optical connector of claim 13, wherein the adhesive composition further comprises between about 1 to about 85 parts by weight of a thermoset resin per 100 parts by weight of the partially cross-linked resin.

15. The optical connector of claim 14, wherein the thermoset resin is an epoxy resin.

16. The optical connector of claim 15, wherein the adhesive composition further comprises between about 0.5 to about 85 parts by weight of a filler material per 100 parts by weight of the partially cross-linked resin.

17. The optical connector of claim 16, wherein the filler material comprises a mineral composition, wherein the mineral composition comprises at least one pyrophosphate of a metal and, wherein the metal is cobalt or magnesium.

18. The optical connector of claim 16, wherein the filler material comprises a material with a negative coefficient of thermal expansion at or near a melting point of the partially cross-linked resin.

19. A method for securing an optical fiber to a ferrule, comprising the steps of:
supplying a ferrule adhesion system, the ferrule adhesion system comprising the ferrule and an adhesive composition;
heating the adhesive composition to a temperature sufficient to melt the adhesive composition;
inserting the optical fiber into a fiber-receiving passage defining an inner surface of the ferrule and into contact with the adhesive composition; and
cooling the adhesive composition;
wherein:
the adhesive composition is disposed within the ferrule and in contact with the inner surface of the ferrule;
the adhesive composition comprises a partially cross-linkable resin prior to the heating step;
the adhesive composition comprises a partially cross-linked resin following the cooling step;
the partially cross-linked resin comprises poly(phenylene sulfide);
the adhesive composition is in a solid form prior to the heating step;
the heating step is performed by a laser of at least 100 W capacity and takes less than 15 seconds until the adhesive composition is melted; and
the cooling step takes less than 5 minutes until the adhesive composition solidifies and partially cross links to secure the optical fiber.

20. The method of claim 19, further comprising heating the partially cross-linkable resin in the presence of air at a temperature of at least about 300° C. to cross-link at least some polymer chains of the partially cross-linkable resin.

21. The optical connector of claim 1, wherein the partially cross-linked resin is one chemical species.

22. The optical connector of claim 21, wherein the one chemical species is selected from the group consisting of a poly(phenylene sulfide), a poly(phyenylene oxide), a polyamide-imide, a liquid crystal polymer, a polyether ether ketone, and a cyclic olefin copolymer.

23. The optical connector of claim 22, wherein the partially cross-linked resin is poly(phenylene sulfide).

24. The optical connector of claim 23, wherein the coupling agent is a silane coupling agent, whereby the adhesive composition comprises between about 0.1 to about 10 parts by weight of the silane coupling agent per 100 parts of the poly(phenylene sulfide).

* * * * *

UNITED STATES PATENT AND TRADEMARK OFFICE
CERTIFICATE OF CORRECTION

PATENT NO. : 8,696,215 B1  
APPLICATION NO. : 13/799255  
DATED : April 15, 2014  
INVENTOR(S) : Edward John Fewkes et al.

Page 1 of 1

It is certified that error appears in the above-identified patent and that said Letters Patent is hereby corrected as shown below:

On the Title Page: Item (72) Inventors:

"Ziwei Lui" should be listed as "Ziwei Liu".

Signed and Sealed this
Eighth Day of July, 2014

Michelle K. Lee
*Deputy Director of the United States Patent and Trademark Office*